June 10, 1952     A. A. GROSSARTH     2,599,758
CONTROL MECHANISM FOR ROLL CURVE GEAR CUTTING MACHINES
Filed March 11, 1949     4 Sheets-Sheet 1

INVENTOR.
Albert A. Grossarth
BY

June 10, 1952 A. A. GROSSARTH 2,599,758
CONTROL MECHANISM FOR ROLL CURVE GEAR CUTTING MACHINES
Filed March 11, 1949 4 Sheets-Sheet 2

INVENTOR.
Albert A. Grossarth
BY

June 10, 1952  A. A. GROSSARTH  2,599,758
CONTROL MECHANISM FOR ROLL CURVE GEAR CUTTING MACHINES
Filed March 11, 1949  4 Sheets-Sheet 3
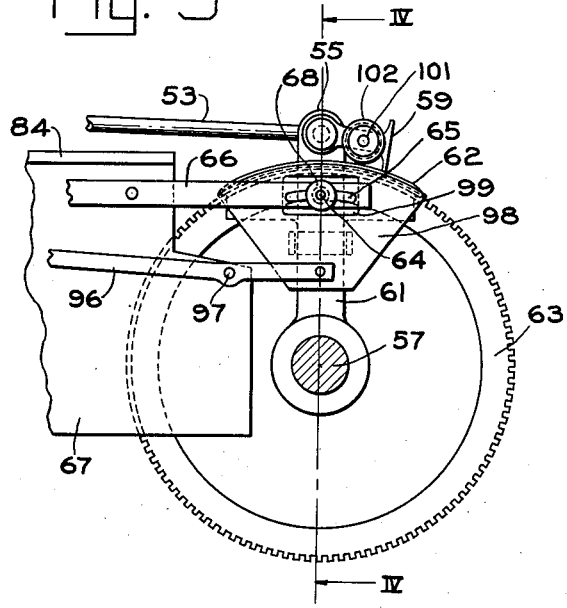
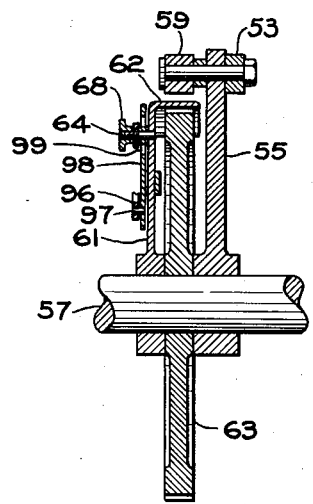
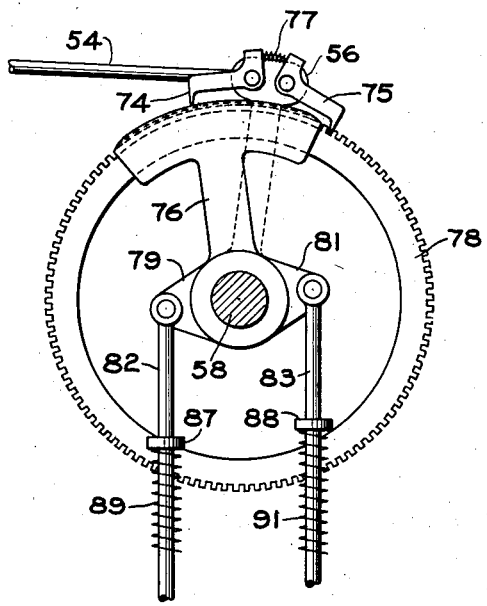
INVENTOR.
Albert A. Grossarth
BY

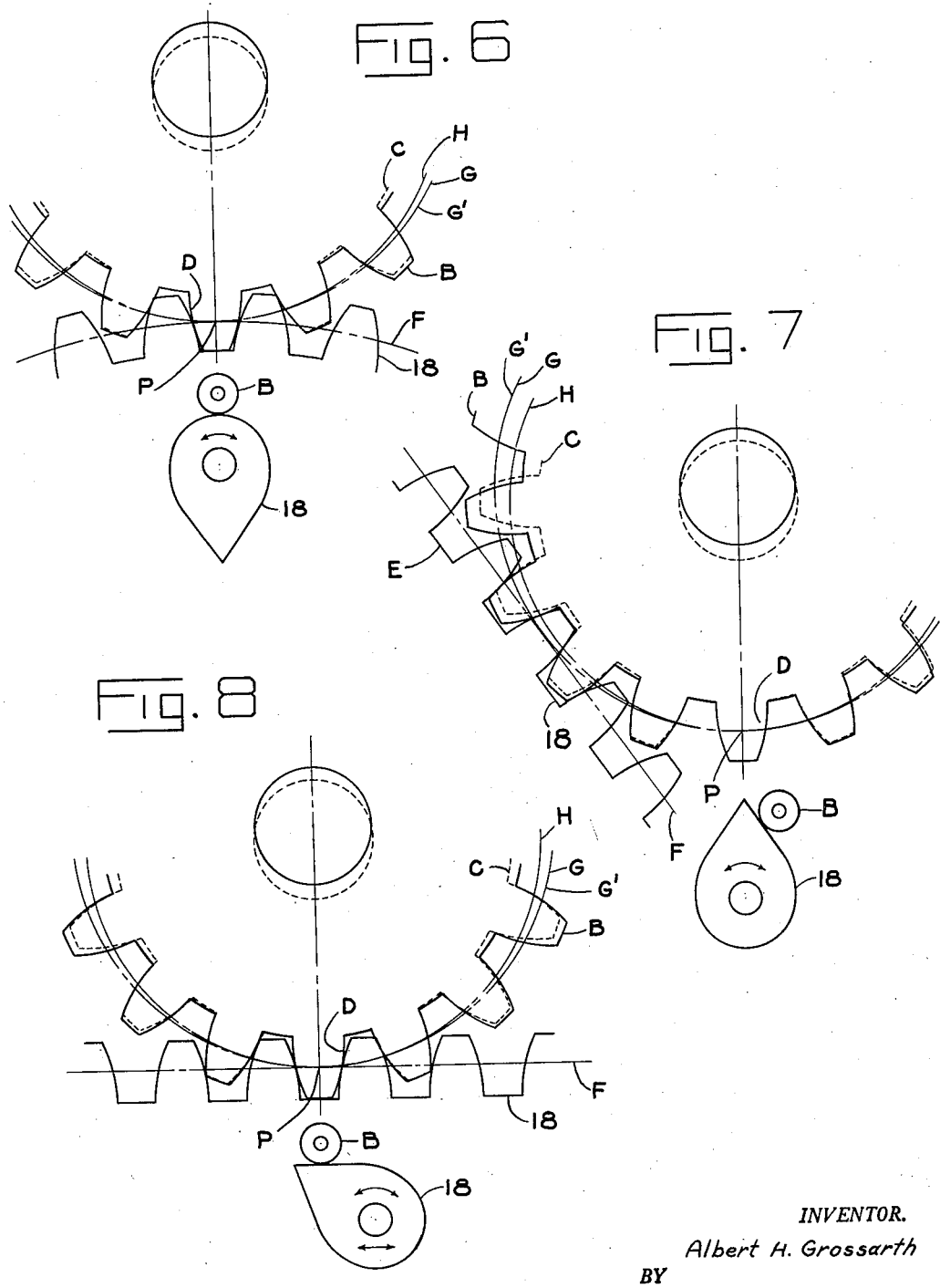

Patented June 10, 1952

2,599,758

UNITED STATES PATENT OFFICE 2,599,758

CONTROL MECHANISM FOR ROLL CURVE GEAR-CUTTING MACHINES

Albert A. Grossarth, La Grange, Ill., assignor to Miehle Printing Press and Manufacturing Company, Chicago, Ill., a corporation of Delaware Application March 11, 1949, Serial No. 80,900

9 Claims. (Cl. 90—2)

This invention relates to roll curve gear cutting machines of the class described in my earlier Patent No. 2,332,570 issued October 26, 1943. More specifically, it pertains to mechanism associated with a roll curve gear cutting machine for automatically maintaining a predetermined cutting relation of a roll curve gear blank with respect to the cutting tool as the gear is being generated.

Roll curve gears and the method of making such gears are disclosed in the United States Letters Patents Nos. 2,253,270 and 2,302,942 issued to Hyman E. Golber.

Prior to my invention, it has been the practice to impart only circumferential movement to a gear blank as it was being generated on a roll curve gear cutting machine, and any irregularity in the curve of the blank was compensated for by rocking the cutter and its supporting mechanism a relative degree about the axis of its supporting shaft. The rocking motion was controlled by the movement of a cutter guide roller as it traversed the master gear pattern thereby maintaining the pitch line of the cutter in proper relation to the pitch line of the gear blank, such roller having a diameter identical to the pitch diameter of the cutter.

This method was highly satisfactory while the cutting tool was new and so long as its original diameter was maintained. However, after the diameter of the cutter was reduced due to wear and repeated sharpening, perfect teeth would no longer be formed on the non-circular, or rack portion of the gear blank. Due to the reduction in diameter of the cutter, the pitch line thereof would no longer coincide with the periphery of the guide roller, making an adjustment of the cutter necessary to bring the pitch line of the cutter tangent with the periphery of the guide roller at a predetermined point. While that tooth of the cutter which is adjacent this point was cutting the teeth, their depth and pitch would be perfect as long as the surface of the gear blank remained at right angles to a radial line connecting the axis of the cutter with the point of tangency of the cutter and the guide roller. So long as a concentric portion of the gear blank was being generated, this right angle relation would prevail as is the case in any conventional circular gear cutting machine, and therefore perfect teeth would be generated, even if the diameter of the cutter became appreciably reduced because of grinding or reconditioning of the cutter.

However, when a non-circular portion of the gear blank advanced into position to be generated, the cutter would be rocked on its supporting trunnion by action of the guide roller on the master pattern and the surface of the gear blank being generated would no longer be at right angles to the said radial line. Consequently, a tooth other than the one in line with the said radial line would be doing the cutting and since its pitch line would not be tangent with that of the gear blank, shallow, imperfect teeth would be cut with the extent of variation depending upon the contour of the gear blank and the reduction in diameter of the cutter.

This condition resulted in a costly procedure of inspection and of running in of the mating gears and in many cases the finished roll curve gear proved so defective that it had to be scrapped. Furthermore, it became necessary to discard the cutter after one or two sharpenings in order to insure the cutting of perfect teeth on all sections of a roll curve gear. This was a wasteful and costly procedure and minimized the utility of the cutting tool.

With my invention, I have provided controls which make possible the production of perfect roll curve gears regardless of the contour thereof or the reduction in size of the cutter, within reasonable limits, thereby greatly increasing the utility of the cutter and very appreciably reducing the production costs of roll curve gears.

Therefore, one of the primary objects of this invention is to provide means whereby the positioning of a roll curve gear bank shall be automatically controlled so as to maintain a predetermined cutting relation of the blank with respect to the cutting tool to thereby insure the cutting of perfect teeth regardless of the contour of the gear to be cut or any variations in the effective diameter of the cutter.

Another object of my invention is to provide means whereby the utility of a cutter used on a roll curve gear cutting machine is substantially increased.

A further important object of the invention resides in the provision of mechanism whereby intermittent rotary motion is transmitted to a roll curve gear blank to be cut, associated with means for moving the blank transversely of the cutting tool to an extent directly dependent on variations in the contour of the blank.

With these and various other objects in view the invention includes certain novel features of construction and manner of operation as will be more fully described and pointed out in the specification, drawings and claims appended hereto.

In the drawings which illustrate a preferred embodiment of my invention and wherein like reference characters are used to designate like parts, Figure 1 is a front elevational view of a gear blank control mechanism constructed in accordance with my invention and showing a portion of the gear cutting machine in conjunction with which it is used;

Figure 3 is an enlarged view of the mechanism which effects the circumferential movement of the gear blank;

Figure 4 is a sectional view taken on line IV—IV of Figure 3;

Figure 5 is an enlarged view of the mechanism which effects the longitudinal movement of the gear blank supporting means;

Figures 6, 7 and 8 are diagrammatic views illustrating the cutting relation of full and reduced diameter cutting tools to a gear blank when used in conjunction with the old type roll curve gear cutting machine as compared to a machine incorporating my invention.

Figure 1:
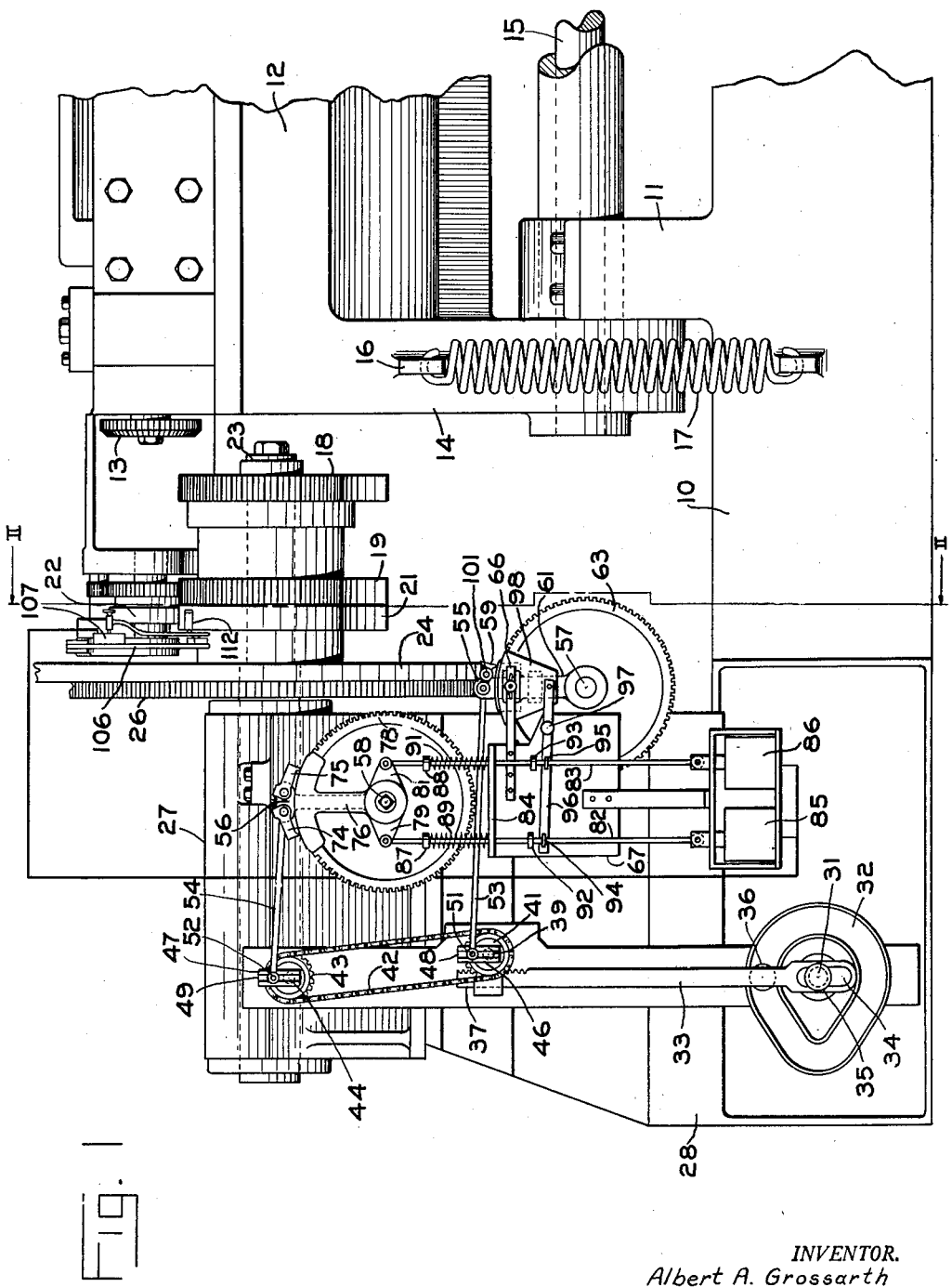

In the embodiment of the invention illustrated in the drawings, it is shown in combination with a roll curve gear cutting machine comprising a base 10 having upright supports 11 on which is mounted the movable frame 12 which supports a reciprocating gear shaper 13. The frame 12 has end portions 14, only one of which is shown, which are connected by a trunnion member 15 which passes through the trunnion bearings or supports 11 whereby the frame 12 is supported by the base 10 in a manner permitting oscillating or rocking movement of the frame. The end portions 14 are provided with an extension or boss 16 to which is secured the coil spring 17 for applying a yielding tension to the frame in order to produce movement thereof on the trunnion 15 in a clockwise direction as viewed from the left in Figure 1.

As a result of this tension applied to the frame 12 the gear cutter 13 is maintained in proper relation to the roll curve periphery of the gear blank 18 during the cutting of the teeth thereon. This control is made possible by the use of a master pattern or cam 21 which has a roll curve periphery identical to that of the gear blank with the exception that the periphery of the master cam corresponds to the pitch line of the roll curve gear to be formed from the gear blank 18. A roller 22 rotatably supported in the frame 12 and having a diameter corresponding to the approximate pitch diameter of the cutter, contacts the roll curve periphery of the master pattern or cam 21 under tension of the spring 17 thereby maintaining the proper relation of the cutter 13 with the gear blank 18. For a more detailed description of the function of the roller 22 and cutter 13 reference may be made to my prior Patent No. 2,332,570.

The gear blank 18, master pattern 21 and a master gear 19 are aligned in spaced relation on the rotatable shaft 23 and are rigidly secured to the face plate 24 which is fixed to the shaft 23. A relatively large worm gear 26 mounted on shaft 23 between the face plate 24 and the housing 27, provides a drive means for the shaft 23, said shaft being suitably journalled for rotation in the housing 27, which is slidably supported on the base unit 28 for transverse movement thereon, said base being rigidly secured to the base 10 of the gear cutting machine.

Figure 2:
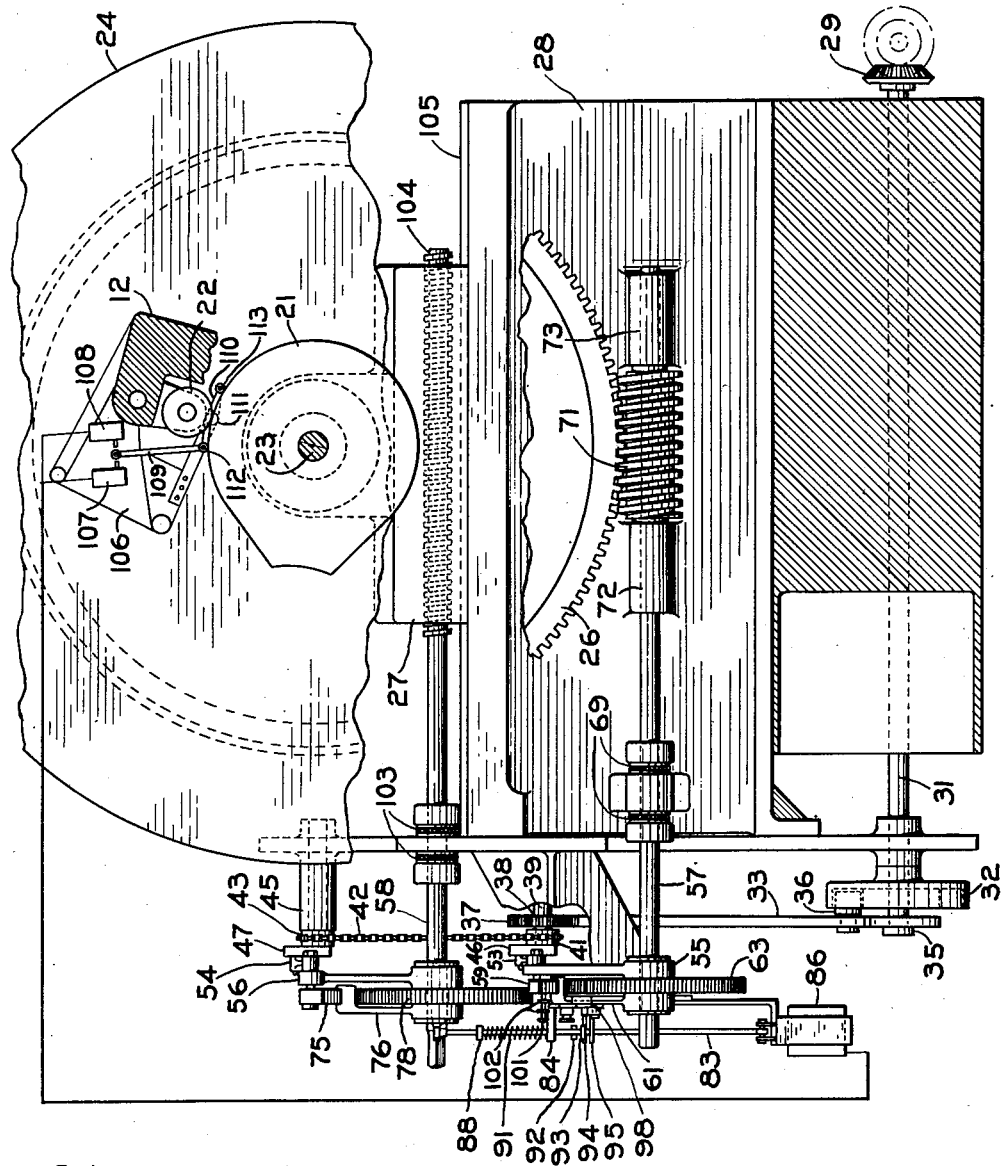
Figure 2 is an end view, in elevation, taken substantially on line II—II of Figure 1.

Power for imparting longitudinal as well as rotary movement to the gear blank 18 is derived from the main drive of the gear cutting machine through a bevel gear 29, see Figure 2, fixed to the shaft 31, which is journalled for rotation in the base 28 and carries at its free end the closed cam 32. A bar 33, having an expanded depending end formed with an elongated slot 34, is fitted over the protruding end of shaft 31, and is maintained in position by the cap 35. A cam roller 36 is rotatably mounted on the bar 33 and arranged to ride in the box cam 32. It will be seen therefore, that rotation of said cam will impart a vertical reciprocating motion to the bar 33 with the elongated slot 34 permitting the raising and lowering of said bar while maintaining its vertical position. At the top of bar 33 and formed integral therewith is a rack 37 having meshing relation with a drive gear 38, see Figure 2, mounted on the shaft 39 which in turn supports the chain sprocket 41. Tracked around the sprocket 41 is a chain 42 which transmits a relative oscillating movement to a second sprocket 43 rotatably mounted on shaft 44 journalled for rotation in the housing 45. Consequently, any reciprocation of bar 33 will be transmitted to both of the sprockets 41 and 43.

Attached to each of the sprockets 41 and 43 and rockable therewith are rectangular shaped bars 46 and 47 which are formed with T-shaped slots 48 and 49 into which are adjustably fitted studs 51 and 52. These studs provide means for pivotally connecting the rods 53 and 54 to the bars 46 and 47 with the free ends of said rods similarly attached to the respective levers 55 and 56 which are loosely mounted on the respective shafts 57 and 58, see Figures 3 and 5. It will be apparent therefore that any oscillating movement of the bars 46 and 47 will be transmitted to levers 55 and 56 and the extent of this movement may readily be varied by adjustment of the studs 51 and 52 in the slots 48 and 49.

Pivotally attached to the lever 55 is the dog or latch 59, see Figures 1, 3 and 4, which is operative to engage the ratchet wheel 63 for the purpose of imparting intermittent rotary motion thereto. The extent or degree of movement of the wheel 63 is regulated by means of the shield 61, loosely mounted on the shaft 57 and having a lip or projection 62 formed concentric with wheel 63 and arranged intermediate the wheel and the dog 59. It will be seen that as the lever 55 oscillates to and fro about the axis of shaft 57 the dog 59 will ride on the curved portion 62 of the shield 61 during a portion of each stroke after which it will drop into engagement with the teeth of the ratchet wheel 63 imparting circumferential movement thereto in a clockwise direction. To vary the degree of movement of the wheel 63 and thereby the shaft 57, depending upon the requirements of the gear being generated, the position of the shield 61 can be varied to regulate the engagement of the dog with the ratchet wheel. A stud 64 having one end rigidly secured in the shield 61, projects through an arcuate slot 65 in the stationary bar 66 fixed to the frame member 67. The purpose of the slot is to permit adjustment of the shield about the axis of shaft 57. Threaded onto the end of the stud 64 is the thumb nut 68 which, when tightened, holds the shield securely in its adjusted position.

The ratchet wheel supporting shaft 57 is suitably journalled for rotation on the frame 28, see Figure 2, with the thrust bearings 69 preventing any axial movement thereof and it drives a worm 71 which is rigidly fixed thereto between the bosses 72 and 73 having meshing relation with the worm gear 26 fixed to the gear blank supporting shaft 23. Rotation of the shaft 57 and thereby the worm 71 imparts a rotary movement to the gear 26 and thereby to the master gear pattern 21 and the gear blank 18.

Transverse movement is transmitted to the gear blank 18 by means of the mechanism associated with lever 56, see Figures 1, 2 and 5. Pivotally attached to the top end of lever 56 in opposed relation are identical dogs or latches 74 and 75 which are operative to engage the ratchet wheel 78 to impart either clockwise or anti-clockwise motion thereto, said motions being controlled by means to be explained hereinafter. A spring 77 urges the dogs 74 and 75 in anti-clockwise and clockwise directions respectively to insure their engagement with the ratchet wheel 78.

To prevent engagement of the dogs 74 and 75 with the ratchet wheel 78 except when transverse movement of the gear blank 18 is required, a shield 76 loosely mounted on shaft 58 and having a lip formed concentric with the wheel 78 provides a surface on which the dogs 74 and 75 ride during their oscillating movements.

The shield 76 is also provided with sidewardly extending arms 79 and 81 to which are connected the rods 82 and 83, which are slidably inserted through the projecting lip 84 of the frame member 67 with their depending ends attached to solenoids 85 and 86, see Figure 1.

Rods 82 and 83 also have mounted thereon collars 87 and 88 which are aligned horizontally and which provide abutments for identical compression springs 89 and 91 concentrically mounted on said rods between said collars and the projection 84 of the frame member 67. Pressure of the springs tends to maintain the arms 79 and 81 in horizontal alignment with the shield 76 in an upright position.

Additional collars 92 and 93 are mounted on the respective rods 82 and 83 and engage the projections 94 and 95 of lever 96 when the rods are actuated by the solenoids 85 or 86.

When one of the rods 82 or 83 is moved downwardly by the action of its respective solenoid, the collar 92 or 93 will engage the projection 94 or 95 causing lever 96 to pivot on the stud 97. This action will raise the shield 98 which is pivotally connected to said lever and slidably mounted for up and down movement on the shield 61 and is formed with an opening 99 therein to provide clearance for the stud 64 permitting adjustment of the shield 61 without affecting the shield 98.

When the shield 98 is in its raised position its arcuate edge engages the stud 101, in dog 59, see Figure 2, between the flanges 102 thereof and prevents the dog 59 from engaging the wheel 63 thereby preventing any circumferential movement of the gear blank 18.

During the cutting of a concentric curved portion of a roll curve gear, shield 76 remains motionless in its upright position and the dogs 74 and 75 ride thereon without engaging the ratchet wheel 78. However, when an irregular or non-circular portion of a gear is being generated, shield 76 is rocked clockwise or anti-clockwise as shown in Figure 5, depending on the contour of the gear, permitting engagement of one of the dogs with the wheel 78. This action imparts rotation to the shaft 58 which is suitably journalled in the thrust bearings 103 and is formed with the threaded portion 104 which is threaded into the housing 27. Housing 27 is slidably mounted on the frame 28 by means of the ways 105 and any rotation of the screw 104 will impart a relative horizontal sliding movement thereto.

Movement of the shield 76 and the resultant horizontal motion of the housing 27 and gear blank 18 is directly controlled by the mechanism as shown in Figure 2. A frame member 106 provides a support for two micro-switches 107 and 108 arranged to be actuated by a substantially L-shaped lever comprising arms 109 and 110 pivotally supported at 111 on the frame member 106. At each end of the arm 110 are cam followers or rollers 112 and 113 which are arranged to traverse the peripheral surface of the master gear pattern 21. The L-shaped lever is so arranged that when arm 109 is in a neutral position, i. e. not actuating either of the micro-switches 107 or 108, the axes of the two rollers 112 and 113 and the pivot point 111 are aligned at right angles to a radial line joining the axis of the gear cutter with the point of tangency of the pitch line of the cutter and the peripheral surface of the guide roller. It will be apparent that as along as a concentric portion of a gear is being cut, the arm 109 will not actuate either of the micro-switches 107 or 108. However, when a non-circular portion of the gear revolves into position to be generated, the neutral position of said L-shaped lever will be disturbed and the arm 109 will close one of the micro-switches 107 or 108 which in turn will actuate the related solenoid 85 or 86 and a corresponding horizontal movement will be imparted to the gear blank until arm 110 resumes its right angle relation with the said radial line joining the cutter axis and the point of tangency of the pitch line of the cutter with the periphery of the guide roller.

The decided advantage of my invention can best be explained with reference to the diagrammatic showing in Figures 6, 7 and 8. Figure 6 is an illustration depicting the manner in which a concentric portion of a roll curve gear was generated, prior to my invention, with only circumferential motion being imparted thereto as indicated by the arrow.

It will be seen with reference to Figure 6 that a new, or full sized cutter B, indicated by the full lines, will cut perfect teeth in the gear blank 18 regardless of the position of the gear blank, because the pitch diameter G of the cutter is identical to and concentric with the periphery of the guide roller, indicated as G'. As a result the pitch line of the cutter B remains tangent to the pitch line F of the blank 18 regardless of the angular relation thereof.

However, when the diameter of the cutter is reduced due to wear and repeated sharpening, as indicated by the dotted lines C in Figure 6, an adjustment of the cutter is necessary to bring its pitch line H tangent with the periphery G' of the guide roller as at the point P. Since this places the cutter eccentric with relation to the guide roller, the only position at which it will generate perfect teeth is that wherein a tooth D of the cutter, in line with the point of tangency P of the pitch line H and the guide roller periphery G', does the cutting.

Therefore, when the contour of the gear blank 18 causes a rocking of the cutter for the purpose of generating teeth on a non-circular portion thereof and as shown in Figure 7, the tooth in line with the point of tangency P would no longer do the cutting. With a full sized cutter B this would have no detrimental effect since its pitch diameter G is equal to and concentric with the periphery G' of the guide roller and as a result remains tangent with the pitch line of the blank and perfect teeth would be cut.

In this position however, a reduced diameter cutter would generate imperfect teeth of a shallower depth and improper angle. With the rocking of the cutter the pitch line F of the gear blank would no longer be tangent to the pitch line H of the cutter at the point P, consequently the tooth D in line therewith would not do the cutting. Instead a tooth on the side of the cutter would generate the teeth and since the cutter is eccentric with respect to the periphery G' of the guide roller, its pitch line H at the actual point of cutting would no longer be tangent to the pitch line F of the gear blank, as indicated in Figure 7, with the result that the teeth generated in the gear blank would be of improper depth and size.

By providing means whereby transverse as well as rotary motion is imparted to the gear blank, during the processing thereof, it is now possible to generate perfect teeth on all portions of a gear blank regardless of the reduction in size of the cutter.

As shown in Figure 8, by imparting both transverse and rotary motion to the gear blank under controls directly responsive to variations in the contour of the master pattern, the pitch line F of the blank 18 is maintained at right angles to a radial line joining the axis of the cutter and the point of the tangency P. As a result the gear blank 18 is always in a position wherein the tooth D which is centered on the point P will always do the cutting and full, perfect teeth will be generated regardless of the contour of the blank or the reduction in size of the cutter.

This compound movement of the gear blank not only insures the cutting of perfect teeth regardless of the shape of the gear being cut, but also greatly increases the utility of the cutter since it can be used to generate gears even after its diameter has been substantially reduced due to wear and resharpening, thereby also greatly reducing the cost of manufacturing roll curve gears.

In operation, see Figure 1, after a gear blank 18 is properly aligned with the master pattern 21 and the master gear 19 on the shaft 23, the gear cutting mechanism is moved into position with the master gear follower or guide roller 22 in contact with the master gear pattern 21. This contact is maintained throughout the cutting operation by the resilient tension of the spring 17 which tends to move the cutter carriage in a clockwise direction about the axis of its supporting trunnion 15.

Simultaneously with the starting of the cutter mechanism, power will be transmitted through the bevel gear 29, see Figure 2, and through the shaft 31 to the box cam 32 which rotates constantly while the cutting machine is in operation. Rotation of the cam 32 will of course impart constant vertical reciprocating motion to the bar 33 by means of the roller 36, which is rotatably fixed thereto, with the slot 34 permitting raising and lowering of the bar while maintaining its vertical position.

The rack formed in the upper end of the bar 33 transmits oscillating motion to the sprocket 41 through the gear 38, see Figure 2, both of which are fixed to the shaft 39, and by means of the chain 42 identical motion is transmitted to sprocket 43. It will be apparent therefore, that by means of the connecting rods 53 and 54 a constant, oscillating motion is transmitted to levers 55 and 56.

While a circular or concentric portion of the gear blank is being generated, the dog 59, see Figures 1 and 3, during each stroke of its reciprocating motion, will move off the curved, flat portion 62 of the shield 61 and engage the ratchet wheel 63 thereby imparting intermittent clockwise rotation to the shaft 57 and thereby to the worm 71, see Figure 2, which transmits a like movement to the worm gear 26 and thereby to the gear blank 18. The extent of movement of the gear blank is directly dependent upon the requirements of the gear being cut and this movement can be increased or decreased by adjusting the eccentricity of the connecting rod stud 51 in the T-slotted bar 48 or by adjusting the position of the shield 61 to increase or decrease the area on which the dog rides thereby increasing or decreasing the number of teeth engaged by the dog on each stroke.

The mechanism will continue operating in this manner by imparting the intermittent rotary motion to the gear blank, until a non-circular or rack portion of the gear blank revolves to a position wherein the cutter will begin to generate teeth thereon.

As will be more clearly seen in Figure 2 when the rack portion of the gear moves into position the arm 110 pivotally mounted at 111 will be rocked in a clockwise direction, actuated by the rollers 112 and 113 which ride on the periphery of the master pattern 21. Clockwise movement of arm 110 effects a relative movement of arm 109 causing said arm to close the micro-switch 108 thereby completing the circuit which actuates the solenoid 86. Figure 1.

This action causes the rod 83 to be depressed against the pressure of spring 91, moving the shield 76 to the right in a clockwise direction and permitting the dog 74, urged by spring 77 to engage ratchet wheel 78 and impart intermittent anti-clockwise motion thereto during each stroke of the lever 56 and as long as the circuit is closed and solenoid 86 maintains rod 83 in the depressed position.

With reference to Figures 1 and 2, it will be seen that rotation of the wheel 78 will impart rotary motion to shaft 53 and thereby to the screw 104 causing the housing 27 and therewith the gear blank 18 to slide horizontally to the right on the ways 105. The extent of movement of the gear blank to the right is controlled directly by means of the rollers 112 and 113 which are actuated by the master pattern 21 and as soon as another circular or concentric portion of the gear blank moves into the cutting area lever 109 will return to its neutral position and the circuit to solenoid 86 will be broken, permitting the spring 91 to return rod 83 and thereby shield 76 to their neutral positions wherein the dogs 74 and 75 will ride on shield 76 and no further horizontal motion will be transmitted to the gear blank.

It is also desirable that during any horizontal movement of the gear blank for the purpose of cutting teeth in the rack portion thereof, all rotary motion of said blank must cease. This is accomplished by means of the collars 92 and 93, see Figure 1, fixed to rods 82 and 83 and which are arranged to engage and depress projections 94 and 95 of lever 96 when either solenoid 85 or 86 depresses their respective rod.

In the illustration given above, when rod 83 was depressed due to the closing of micro-switch 108 by lever 109, collar 93 engaged projection 95 thereby depressing lever 96 causing said lever to pivot about the stud 97. This movement effects a raising of the shield 98, due to its pivotal connection to lever 96, see Figures 2, 3 and 4, causing the curved top edge to move up and engage the pin 101 fixed to the dog 59 and between the flanges 102 formed on said pin. In this position the pin 101 rides on the shield 98 while the lever 55 continues its oscillating movement, preventing the dog 59 from dropping into engagement with the ratchet wheel 63 with the result that all rotary motion of the gear blank is halted while any horizontal movement is being imparted thereto.

In the event arm 110 is moved in a counterclockwise direction by virtue of the contour of the master pattern 21, lever 109 will close microswitch 107 completing the circuit to solenoid 85 and rod 82 will be depressed. This action would cause shield 76 to be moved to the left as shown in Figure 5 with the result that dog 75 would then engage wheel 78 imparting clockwise movement thereto and to the screw 104 effecting a horizontal movement of the gear blank to the left. In that event collar 92 on rod 82, Figure 1, would engage projection 94 thereby depressing lever 96 and moving shield 98 into position to prevent rotary motion of the gear blank.

While I have herein disclosed a preferred embodiment of my invention for the purpose of illustrating its basic principles, I wish it to be understood that it is my intention to cover any such modifications in structure and modes of operation as will come within the meaning and scope of the claims appended hereto.

I claim:

1. In a roll curve gear cutting machine, in combination, a rotatable workholding member having fixed thereto in aligned relation a gear blank and a master pattern of similar contour, a reciprocating gear cutter for cutting teeth on the gear blank, first driving means having operation to impart intermittent rotary movement to said workholding member to index the gear blank, second driving means having operation to impart intermittent transverse movement to the workholding member to move the gear blank transversely to the axis of the gear cutter, and control means responsive to the contour of the master pattern for correlating the movements imparted to said workholding member by said first and second drive means to thereby maintain the angular relation between the surface of the gear blank and the gear cutter substantially constant during the gear cutting operation.

2. In a roll curve gear cutting machine, the combination with a workholding member for supporting a master pattern and a gear blank in aligned relation, and a reciprocating rotary gear cutter for shaping teeth on such blank, of drive means for imparting intermittent rotary motion to said member to index the gear blank, additional drive means for imparting intermittent transverse motion to said member to move the gear blank transversely to the axis of the cutter, and control mechanism associated with both said drive means and responsive to variations in the contour of said master pattern for controlling the direction and extent of the motions imparted to said member by both said drive means to thereby maintain a predetermined angular relation between the master pattern and thus the gear blank and the cutter during the gear cutting operation.

3. In a roll curve gear cutting machine, the combination comprising a workholding member for supporting a gear blank and a master pattern in aligned relation, a reciprocating rotary gear cutter for shaping teeth in the gear blank, a guide roller associated with said cutter and having rolling contact with the periphery of said master pattern, the pitch circle of the cutter and the periphery of the guide roller having a predetermined point of tangency, drive means operative to impart intermittent rotary and intermittent lateral movement respectively to said workholding member, and control means associated with said drive means and operative to control the timing of the rotary and lateral movements imparted to said workholding member with direct relation to the contour of said master pattern to thereby maintain the surface of the master pattern and thus the gear blank substantially at right angles to a radial line between said point of tangency and the axis of said cutter during the gear cutting operation.

4. In a roll curve gear cutting machine, the combination with a workholding member for supporting a gear blank and a master pattern in aligned relation, and a reciprocating cutter for cutting teeth in said blank, of first drive means including a pawl and ratchet operative when engaged to impart intermittent rotary motion to said member to index the gear blank, second drive means also including a pawl and ratchet operative when engaged to impart intermittent transverse motion to said member to move the gear blank transversely to the axis of the cutter, means associated with the second drive means for disengaging the first drive means when said second drive means is engaged, and control mechanism arranged to be actuated by variations in the contour of the master pattern for controlling the engagement of the respective drive means, whereby the angular and lateral displacement of the member is controlled with direct relation to the master pattern to thereby maintain a predetermined angular relation between said master pattern and thus the gear blank and the cutter while a gear blank is being generated.

5. In a gear cutting machine, in combination, a rotatable workholding member having fixed thereto in aligned relation a gear blank and a master pattern of similar contour, a reciprocating gear cutter for cutting teeth on the gear blank, a guide roller associated with the gear cutter and having rolling contact with the periphery of the master pattern, means supporting the rotatable workholding member for bodily movement in a direction transverse to the axis of the cutter, first drive means including an oscillating ratchet member for imparting intermittent rotary movement to said workholding member for indexing the gear blank, second drive means also including an oscillating ratchet member for imparting intermittent transverse movement to the workholding member to move the gear blank bodily with respect to the gear cutter, mechanism in associated relation with both said drive means for rendering the ratchet member of one drive means inoperative when the ratchet member of the other drive means is operative, and control means having actuation in response to the contour of the master pattern for controlling said mechanism so that one or the other of said drive means is operative, whereby to maintain the pitch line of the gear blank tangent to the pitch circle of the gear cutter regardless of variations in the contour of the gear blank or changes in the diameter of the gear cutter with respect to the guide roller.

6. In a gear cutting machine, as defined by claim 5, additionally including means for adjusting the degree of oscillating movement of said ratchet members respectively, whereby to adjust the degree of rotary movement and the extent of transverse movement imparted to the gear blank for each complete oscillating cycle of the ratchet members.

7. In a roll curve gear cutting machine, in combination, a rotatable workholding member having fixed thereto in aligned relation a gear blank and master pattern of similar contour, a reciprocating gear cutter for generating teeth in the blank, first drive means having operation when effective to impart rotary motion to said workholding member to index the gear blank, second drive means having operation when effective to impart transverse motion to said workholding member to move the gear blank bodily to the right or left with respect to the axis of the gear cutter, shield means associated with said first and second drive means and having operation to render the respective drive means effective and ineffective as well as to determine the direction in which said workholding member is moved transversely with respect to said cutter, and control means responsive to variations in the contour of the master pattern for actuating the shield means to thereby correlate the rotary and transverse motions imparted to said member whereby the angular relation between the gear blank and the cutter is maintained substantially constant during the cutting operation.

8. In a roll curve gear cutting machine, in combination, a rotatable workholding member having fixed thereto in aligned relation a gear blank and a master pattern of similar contour, a reciprocating gear cutter for generating teeth in the blank, first drive means including an oscillating ratchet member having engaged and disengaged positions and operative when engaged to impart intermittent rotary motion to said workholding member to index the gear blank, second drive means including an oscillating ratchet member having engaged and disengaged positions and operative when engaged to impart transverse motion to the workholding member to thereby move the gear blank bodily to the left or right with respect to the axis of the cutter, a movable shield having a first position wherein it maintains the ratchet member of the second drive means disengaged, a second position wherein said ratchet member is engaged to move the workholding member to the left and a third position wherein said ratchet member is engaged to move the workholding member to the right, mechanism associated with said shield and effective to disengage the ratchet member of the first drive means when said shield is moved to said second or third position, and control means responsive to the contour of the master pattern and having operation to control the positioning of said shield and thereby engagement of the ratchet members of the respective drive means with direct relation to the contour of the master pattern.

9. In a gear cutting machine, in combination, a rotatable workholding member having fixed thereto in aligned relation a gear blank of noncircular contour and a master pattern of similar contour, a reciprocating gear cutter for cutting teeth on the gear blank, means supporting the rotatable workholding member for bodily movement in a direction transverse to the axis of the cutter, first drive means including an oscillating ratchet member for imparting intermittent rotary movement to said workholding member for indexing the gear blank, second drive means also including an oscillating ratchet member for imparting intermittent transverse movement to the workholding member to move the gear blank bodily with respect to the gear cutter, a first shield in associated relation with the ratchet member of the first drive means and being normally positioned to render the ratchet member thereof operative, a second shield in associated relation with the ratchet member of the second drive means and being normally positioned to render the ratchet member thereof inoperative, mechanism having operative connection with said shields for actuating the same whereby to render the ratchet member of the second drive means operative and the ratchet member of the first drive means inoperative, and control means having contact with the periphery of the master pattern anad controlling the mechanism so that during the cutting of the circular portion of the gear blank the first drive means is operative to impart intermittent rotary movement to the gear blank, and whereby said control means becomes effective due to contact with the noncircular portion of the master pattern to actuate the mechanism to render the first drive means inoperative and the second drive means operative for moving the gear blank bodily with respect to the gear cutter.

ALBERT A. GROSSARTH.

REFERENCES CITED

The following references are of record in the file of this patent:

UNITED STATES PATENTS

| Number | Name | Date |
|---|---|---|
| 1,879,388 | Mershon | Sept. 27, 1932 |
| 2,261,052 | Coffin et al. | Oct. 28, 1941 |
| 2,367,100 | Cullman et al. | Jan. 9, 1945 |
| 2,394,757 | Drummond | Feb. 12, 1946 |
| 2,415,801 | Armitage et al. | Feb. 11, 1947 |